(12) United States Patent
Singh et al.

(10) Patent No.: US 10,650,374 B1
(45) Date of Patent: May 12, 2020

(54) SYSTEM, METHOD, AND COMPUTER PROGRAM FOR IMPLEMENTING HIGH PERFORMANCE DIGITAL WALLETS

(71) Applicant: Amdocs Software Systems Limited, Dublin (IE)

(72) Inventors: Ajeet Singh, Blackburn (AU); Naresh Chandra Miriyala, Dandenong North (AU); Ali Badiei, Surrey Hills (AU); Peter Dimopoulos, Glen Iris (AU); Martin T J Balderstone, Glen Iris (AU)

(73) Assignees: AMDOCS DEVELOPMENT LIMITED, Limassol (CY); AMDOCS SOFTWARE SYSTEMS LIMITED, Dublin (IE)

( * ) Notice: Subject to any disclaimer, the term of this patent is extended or adjusted under 35 U.S.C. 154(b) by 887 days.

(21) Appl. No.: 14/920,763

(22) Filed: Oct. 22, 2015

(51) Int. Cl.
*G06Q 20/36* (2012.01)

(52) U.S. Cl.
CPC ................. *G06Q 20/3678* (2013.01)

(58) Field of Classification Search
None
See application file for complete search history.

(56) References Cited

U.S. PATENT DOCUMENTS

| | | | | |
|---|---|---|---|---|
| 2004/0153407 A1* | 8/2004 | Clubb | ............. | G06Q 20/105 705/41 |
| 2013/0159180 A1* | 6/2013 | Jhunjhunwala | ...... | G06Q 20/227 705/41 |
| 2014/0379569 A1 | 12/2014 | Kang et al. | | |
| 2016/0210597 A1* | 7/2016 | Zhu | ............. | G06Q 20/10 |
| 2016/0260097 A1* | 9/2016 | Nadella | ............. | G06Q 20/405 |

FOREIGN PATENT DOCUMENTS

| | | | | |
|---|---|---|---|---|
| AU | 2010204567 A1 * | 8/2011 | ............ | G06Q 40/02 |
| GB | 2481820 A | 1/2012 | | |
| GB | 2518802 A | 4/2015 | | |
| WO | 2013166507 A1 | 11/2013 | | |
| WO | 2014011691 A1 | 1/2014 | | |
| WO | 2015025353 A1 | 2/2015 | | |

OTHER PUBLICATIONS

Halperin et al., "Debit Card Danger," Jan. 25, 2007, Center for Responsible Lending, p. 16 (Year: 2007).*

* cited by examiner

*Primary Examiner* — Abhishek Vyas
*Assistant Examiner* — Dario Bianco
(74) *Attorney, Agent, or Firm* — Zilka-Kotab, P.C.

(57) ABSTRACT

A system, method, and computer program product are provided for implementing high performance digital wallets. In use, a digital wallet with a plurality of transactions to process is identified. Further, a plurality of digital proxy-wallets are associated with the digital wallet. Additionally, digital currency from the digital wallet is allocated to the plurality of digital proxy-wallets. Moreover, the plurality of transactions are automatically processed in parallel utilizing the plurality of proxy-wallets such that the transactions are processed against the digital wallet.

20 Claims, 9 Drawing Sheets

SYSTEM, METHOD, AND COMPUTER PROGRAM FOR IMPLEMENTING HIGH PERFORMANCE DIGITAL WALLETS

FIELD OF THE INVENTION

The present invention relates to digital wallets and more particularly to enhancing transaction processing associated with such wallets.

BACKGROUND

A digital wallet refers to applications and software implemented utilizing an electronic device that allows an individual to make electronic commerce transactions. The electronic commerce transactions may include utilizing a mobile phone to purchase items at a physical store. Digital wallets may also include components for authenticating credentials of users of such digital wallets.

Digital wallets with a high volume of transactions currently process transactions serially and must wait for the previous transaction to release a lock on the wallet before the process can continue. This lack of concurrency in transaction processing causes high volumes of transactions to be processed at a much slower pace.

There is thus a need for addressing these and/or other issues associated with the prior art.

SUMMARY

A system, method, and computer program product are provided for implementing high performance digital wallets. In use, a digital wallet with a plurality of transactions to process is identified. Further, a plurality of digital proxy-wallets are associated with the digital wallet. Additionally, digital currency from the digital wallet is allocated to the plurality of digital proxy-wallets. Moreover, the plurality of transactions are automatically processed in parallel utilizing the plurality of proxy-wallets such that the transactions are processed against the digital wallet.

DETAILED DESCRIPTION

Figure 1:
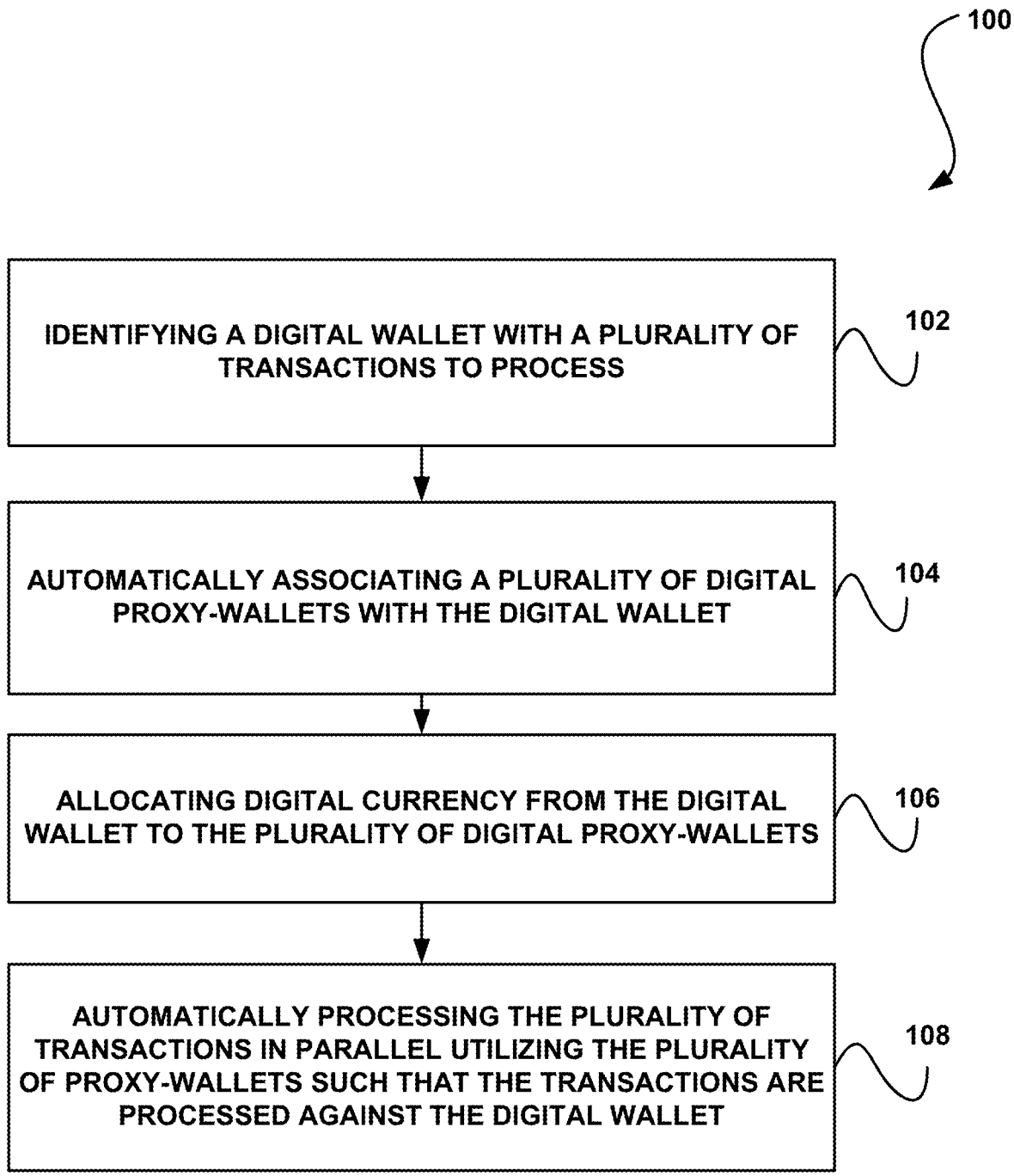
FIG. 1 illustrates a method for implementing high performance digital wallets, in accordance with one embodiment.

FIG. 1 illustrates a method 100 for implementing high performance digital wallets, in accordance with one embodiment.

As shown, a digital wallet with a plurality of transactions to process is identified. See operation 102. The digital wallet may include any device or application that allows an individual or entity to make electronic commerce transactions.

Electronic commerce transactions may include, for example, purchasing items on-line with a computer or using a smartphone to purchase something at a physical store, etc. In various embodiments, the digital wallet may include a payroll wallet, an operator fee collection wallet, a biller wallet, a stock wallet, and/or a distributor wallet, etc.

The electronic device implementing the digital wallet may utilize various technology to facilitate the electronic commerce transactions. For example, near field communication (NFC) technology/components of the electronic device may be utilized to facilitate the transactions. The electronic device may include, for example, a mobile phone, a PDA, a tablet computer, and/or various other devices.

Further, in one embodiment, a bank account of the user of the digital wallet may be linked to the digital wallet. In various other embodiments, the digital wallet may be linked to other digital items, such as, for example, a driver's license, a health card, a loyalty card, and/or other identification documents, etc.

With further reference to FIG. 1, a plurality of digital proxy-wallets are associated with the digital wallet. See operation 104. The proxy-wallets may include any auxiliary or proxy configured to facilitate a transaction associated with the main digital wallet.

In the context of the present description, a proxy refers to any agent or substitute authorized to act for another entity. Thus, the digital proxy-wallets refer to digital wallets that are configured and authorized to act on behalf of the main digital wallet.

In one embodiment, the number of proxy-wallets used may be automatically configured based on the number of transactions to process. For example, a number of transactions to process may be determined and the number of proxy-wallets required to facilitate that number of transactions may then be determined and/or configured for use, etc. In another embodiment, the number of proxy-wallets used may be manually configured.

Additionally, digital currency from the digital wallet is allocated to the plurality of digital proxy-wallets. See operation 106. The digital currency may include any type of currency associated with the particular digital wallet, such as a hard currency, an electronic currency, credits, money, etc.

Moreover, the plurality of transactions are automatically processed in parallel utilizing the plurality of proxy-wallets such that the transactions are processed against the digital wallet. See operation 108.

The digital wallet may be configured to process the transactions serially when not utilizing the digital proxy-wallets. However, by processing the transactions in parallel utilizing the proxy-wallets, the transactions may be processed in a shorter time period than processing the transactions serially when not utilizing the digital proxy-wallets. In one embodiment, the method 100 may be implemented by an application or program associated with the digital wallet.

In operation, there may be some scenarios where a residual amount of currency is left in the proxy wallets after an initial transaction. In this case, there may or may not be enough balance in a proxy wallet to complete another transaction. However, a remaining cumulative amount of currency over all the proxy wallets may be enough to complete the transaction.

In this case, an attempt may be made to acquire a lock on a proxy wallet. If there is not a sufficient balance on that proxy wallet (or multiple proxy wallets), an attempt to lock the master wallet may be made to process the transaction.

In some cases, there may not even be enough of a balance in the master wallet, but there may be sufficient residual balance in proxy-wallets to complete the additional transactions in total. Thus, a lock on the master wallet may be attempted. After a lock on the master wallet is acquired, an attempt may be made to lock all the proxy-wallets to accumulate the amount to be adjusted for the transaction.

In accordance with these scenarios, in one embodiment, the method 100 may further include identifying remaining currency corresponding to one or more of the plurality of digital proxy-wallets after the automatic processing of the plurality of transactions. Further, it may be determined whether the remaining currency corresponding to the one or more of the plurality of digital proxy-wallets is enough currency to complete at least one additional transaction.

In this case, it may be determined whether a cumulative amount of currency of all of the one or more of the plurality of digital proxy-wallets is enough currency to complete the at least one additional transaction. If the cumulative amount of currency of all of the one or more of the plurality of digital proxy-wallets is enough currency to complete the additional transaction, the one or more of the plurality of digital proxy-wallets may be utilized to allocate the cumulative amount of currency to complete the additional transaction.

If the cumulative amount of currency of all of the one or more of the plurality of digital proxy-wallets is not enough currency to complete the additional transaction, the digital wallet may be locked to determine whether the cumulative amount of currency and an additional amount of currency from the master wallet is enough to complete the a additional transaction.

In various embodiments, the operations of method 100 may be implemented utilizing various hardware and/or software, such as one or more processors implementing various logic, etc.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
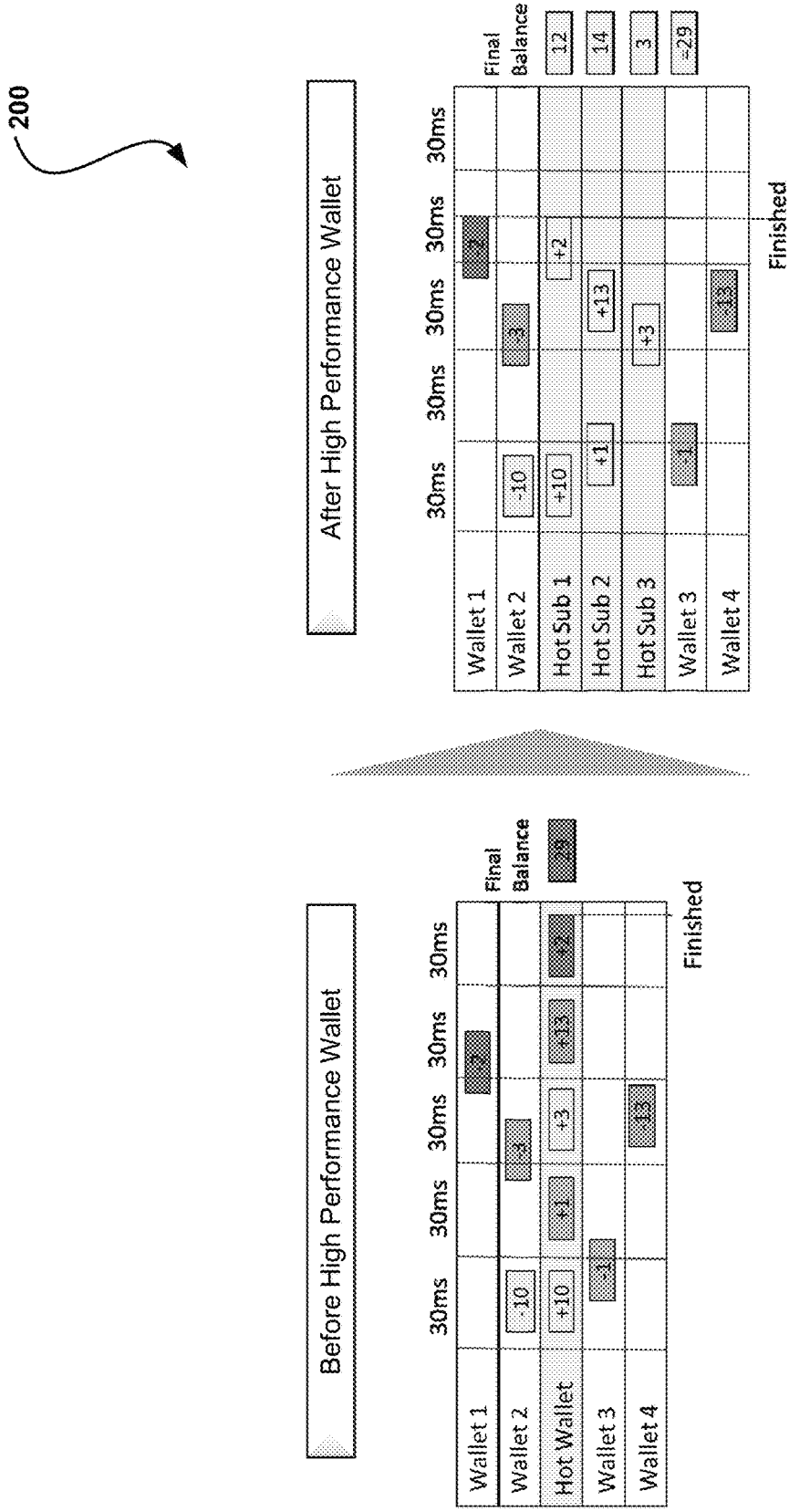
FIG. 2 illustrates an example showing a high performance wallet versus a standard performing wallet, in accordance with one embodiment.

FIG. 2 illustrates an example 200 showing a high performance wallet versus a standard performing wallet, in accordance with one embodiment. As an option, the example 200 may be viewed in the context of the details of FIG. 1. Of course, however, the example 200 may be viewed in the context of any desired environment. Further, the aforementioned definitions may equally apply to the description below.

In the example on FIG. 2, the high performance wallet implementation takes 100 ms to complete all five transactions. The standard wallet implementation takes 150 ms to complete all five transactions.

Standard wallets with a high volume of transactions currently process transactions serially and must wait for the previous transaction to release the lock on the wallet before it can continue. This lack of concurrency in transaction processing causes high volumes to be processed at a much slower pace. The high performance wallet implementation described herein automatically uses proxy-wallets that will process transactions in parallel against the same wallet.

The high performance wallet feature benefits any wallets that process a high-volume of transactions, such as payroll wallets, operator fee collection wallets, biller wallets, stock wallets, and distributor wallets, etc.

The high performance wallet may be utilized and implemented by a variety of entities. Such entities may include, for example, billers, salary payers, TDL agents, suppliers, MFS operators, NGOs, etc.

The high performance wallet implementation described herein offers significant performance improvements, including performing high-volume transaction faster and more efficiently than standard implementations. The high performance wallet implementation described herein also improves database performance with asynchronous access and background processing.

To implement the high performance wallet for a high volume debtor, in one embodiment, a flag may be added on an agent. Further, a configurable number of proxy accounts may be created. Using the proxy accounts allows for a reduction of locking time in transactions, which involves debiting money from one of the agent's wallets. This leads to an overall increase in performance in bulk operations and similar kind of high volume transactions.

Figure 3:
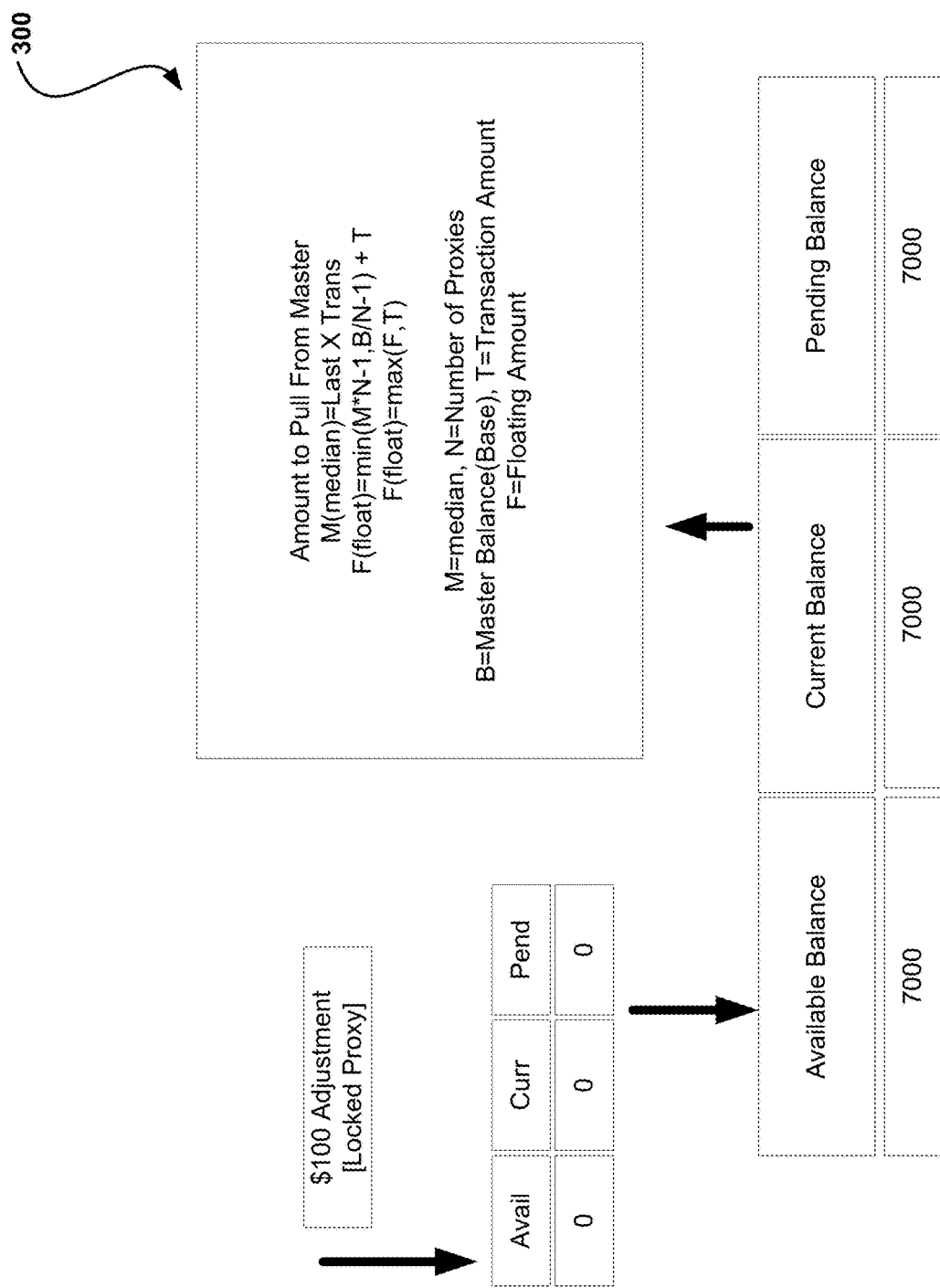
FIG. 3 illustrates an example showing balance updates for proxies, in accordance with one embodiment.

FIG. 3 illustrates an example 300 showing balance updates for proxies, in accordance with one embodiment. As an option, the example 300 may be viewed in the context of the details of the previous figures. Of course, however, the example 300 may be viewed in the context of any desired environment. Further, the aforementioned definitions may equally apply to the description below.

As shown, an amount of currency to pull from a master wallet to add to one or more proxies may depend on the number of proxies, the master wallet balance, and the transaction amount.

FIG. 3 illustrates a process of how actually the requests are being processed using the account proxies for a high volume debtor involved in the transaction. The process involves logic determining how the proxy accounts are given money from the master account having the main balance for the debtor involved in the transaction.

Once the request is received for X amount, if the agent, from which amount is being deducted, is marked as high volume debtor, the transaction first will try to lock one of the proxy wallets from which to deduct the money. If the proxy does not have sufficient balance to deduct the complete amount, the proxy will then try to pull money from master account based on the formulae shown in FIG. 3.

Using the formulae, the median amount is calculated based on parameters such as the number of proxies the agent has, the transaction amount, the number of the last N financial transaction being user as reference for their amount values. This formulae calculates and pull amounts sufficient enough for N transactions in the future, so that locking of the master account or pulling money in each transaction can be avoided.

Figure 4:
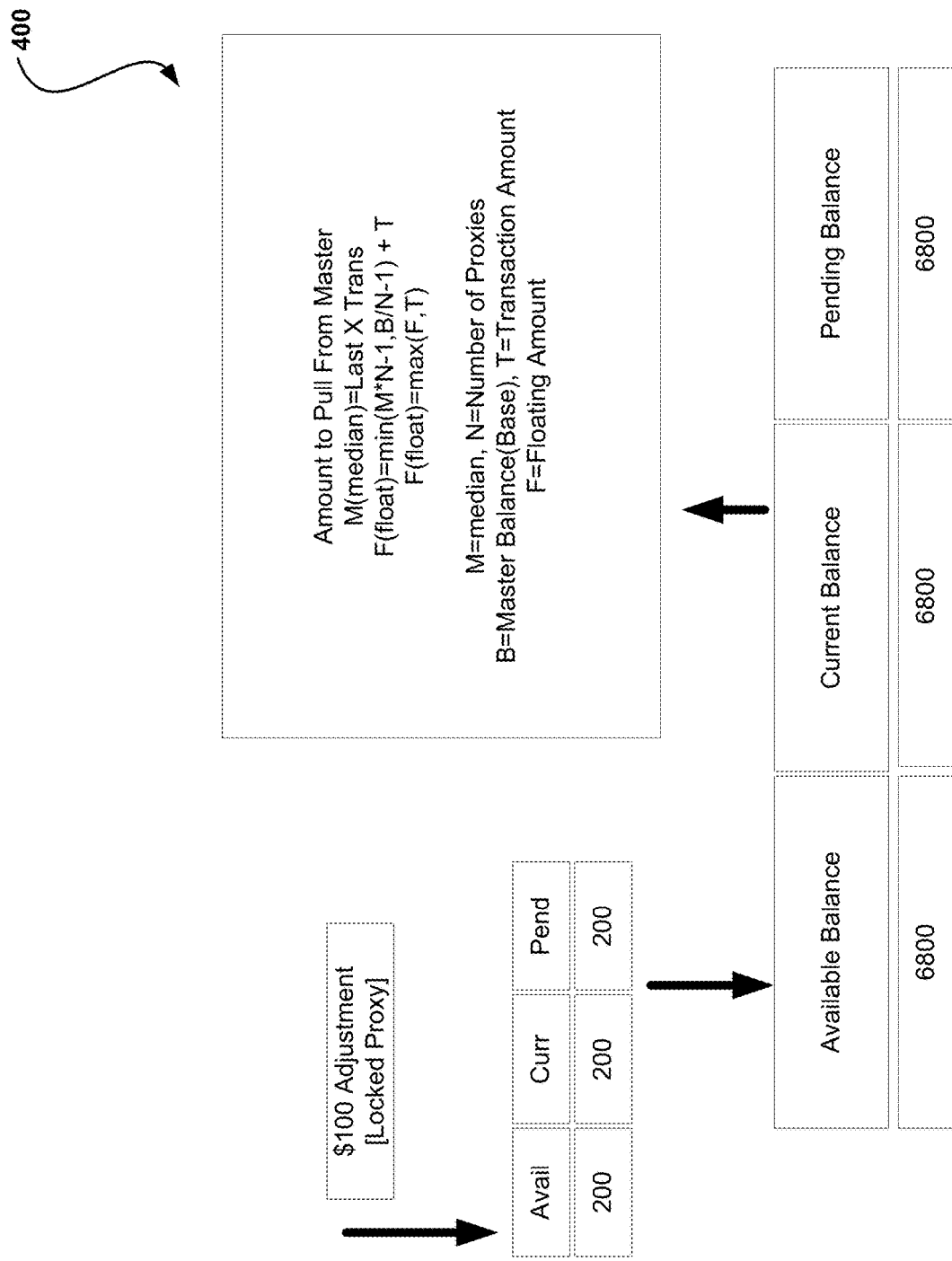
FIG. 4 illustrates an example showing balance top up for proxies, in accordance with one embodiment.

FIG. 4 illustrates an example 400 showing balance top up for proxies, in accordance with one embodiment. As an option, the example 400 may be viewed in the context of the details of the previous figures. Of course, however, the example 400 may be viewed in the context of any desired environment. Further, the aforementioned definitions may equally apply to the description below.

FIG. 4 shows an example of a transaction for $100 that was received, which was actually the first transaction, and based on the formulae, the amount to be pulled from the master account is calculated, the master account locked, and $200 is obtained from the master account and put into one of the proxy wallets, which is locked for the current transaction for the amount of $100. This will complete the current transaction and there will also be some funds to complete the upcoming future transaction. This reduces the number of times the master account is locked and results in populating all the proxies with a sufficient amount for current and some future transaction, which will result in a parallel N number transaction being processed at the same time, where N will be equal to the number of proxy accounts for that agent.

Figure 5:
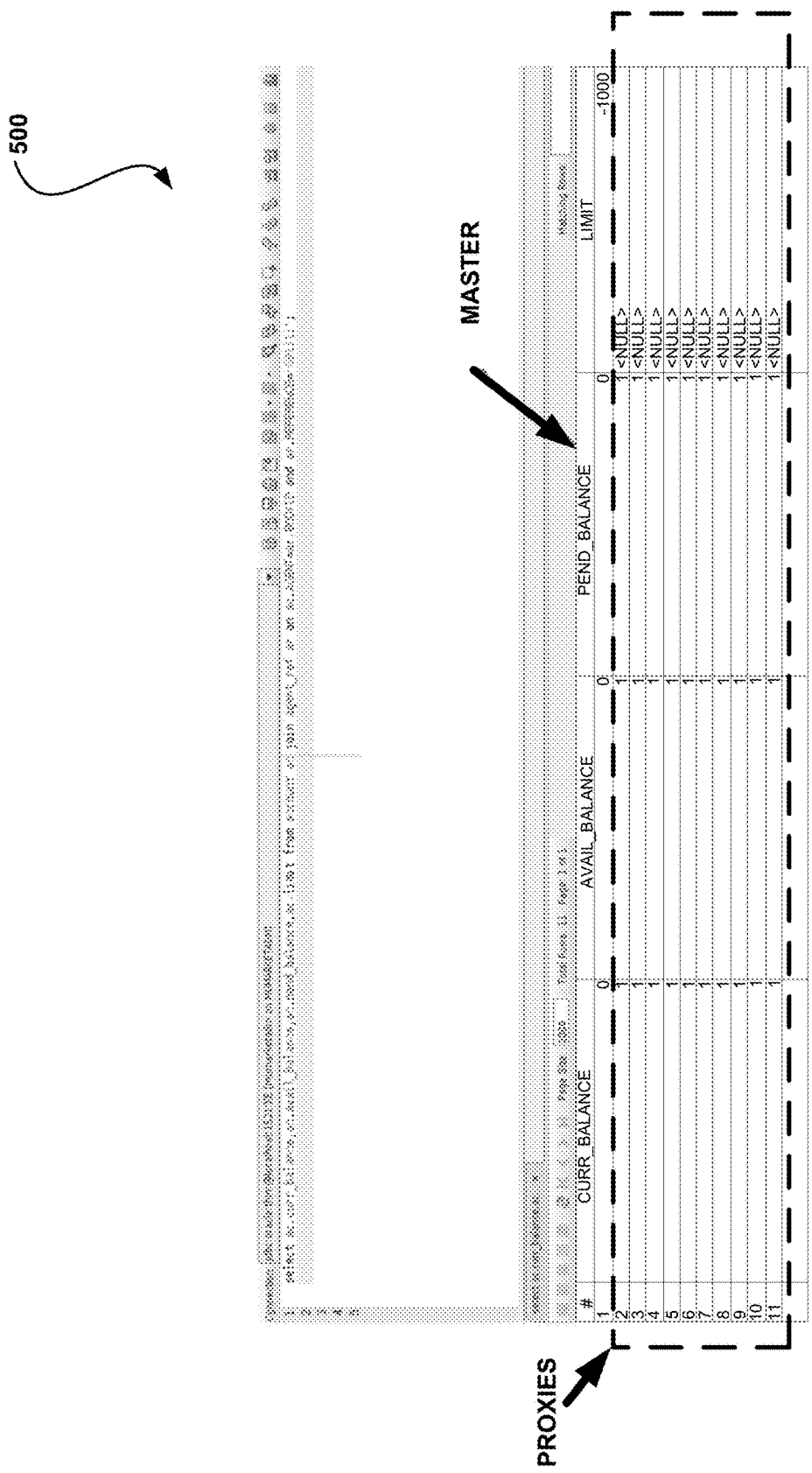
FIG. 5 illustrates an example showing agent balances with proxies in a database, in accordance with one embodiment.

FIG. 5 illustrates an example 500 showing agent balances with proxies in a database, in accordance with one embodiment. As an option, the example 500 may be viewed in the context of the details of the previous figures. Of course, however, the example 500 may be viewed in the context of any desired environment. Further, the aforementioned definitions may equally apply to the description below.

In the case that the master wallet does not have a sufficient balance to fill the proxy-wallets, but the overall proxies have enough balance to fulfill the transaction, all the wallets are locked to complete the transactions.

When performing transactions from a high volume debtor, there could be scenarios where some residual amount is left behind in proxies, but there is not enough balance in one proxy to complete the transaction, but rather the transactions may be completed with overall residual amounts in the proxies.

In this case, an attempt may be made to acquire a lock on a proxy. If there is not a sufficient balance on the proxy, an attempt to lock the master wallet may be made to process the transaction. This is described in FIG. 6.

Figure 6:
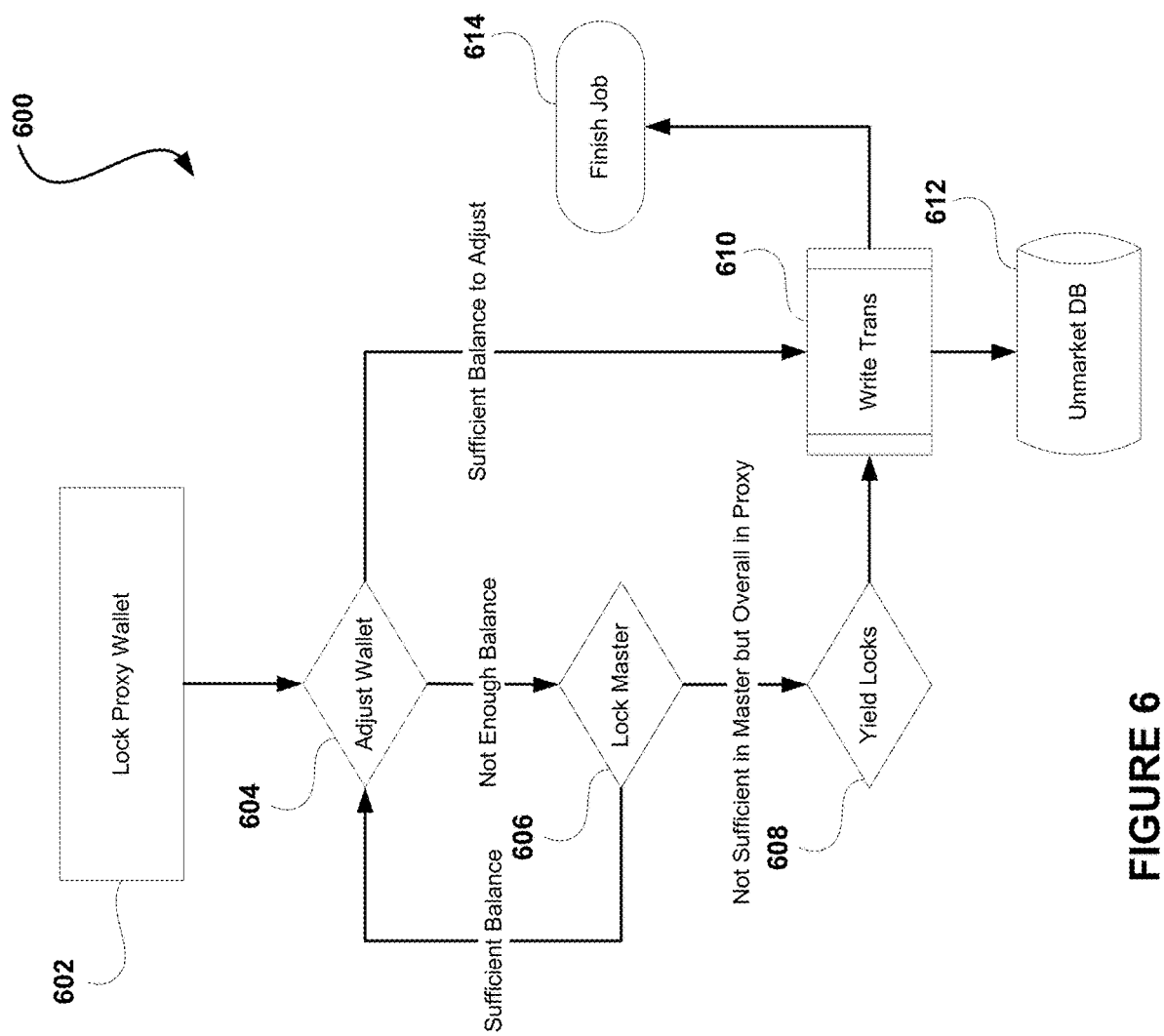
FIG. 6 illustrates an example of a high volume debtor performance improvement design flow, in accordance with one embodiment.

FIG. 6 illustrates an example 600 of a high volume debtor performance improvement design flow, in accordance with one embodiment. As an option, the example 600 may be viewed in the context of the details of the previous figures. Of course, however, the example 600 may be viewed in the context of any desired environment. Further, the aforementioned definitions may equally apply to the description below.

As shown in FIG. 6, one or more proxy wallets are locked. See operation 602. Further, it is determined whether there is sufficient balance to adjust the proxy wallet. See operation 604.

If there is sufficient balance to adjust the proxy wallet, the proxy wallet is adjusted and the transaction is written. See operation 610. Further, a database associated with the transaction is un-marketed and the job is completed. See operations 612 and 614.

If there is not enough balance to adjust the proxy wallet, the master wallet is locked. See operation 606. If there is sufficient balance in the master wallet, the transaction is written.

If there is not sufficient balance in the master wallet, but there is overall enough balance in the proxy wallets (i.e. cumulatively), the locks are yielded and the transaction is written. See operation 608.

In some cases, there may not even be enough of a balance in the master wallet, but there may be sufficient residual balance in proxy-wallets to complete one or more transactions in total. Thus, a lock on the master wallet may be attempted. After a lock on the master wallet is acquired, an attempt may be made to lock all the proxy-wallets to accumulate the amount to be adjusted for the transaction. This is described in FIG. 7.

Figure 7:
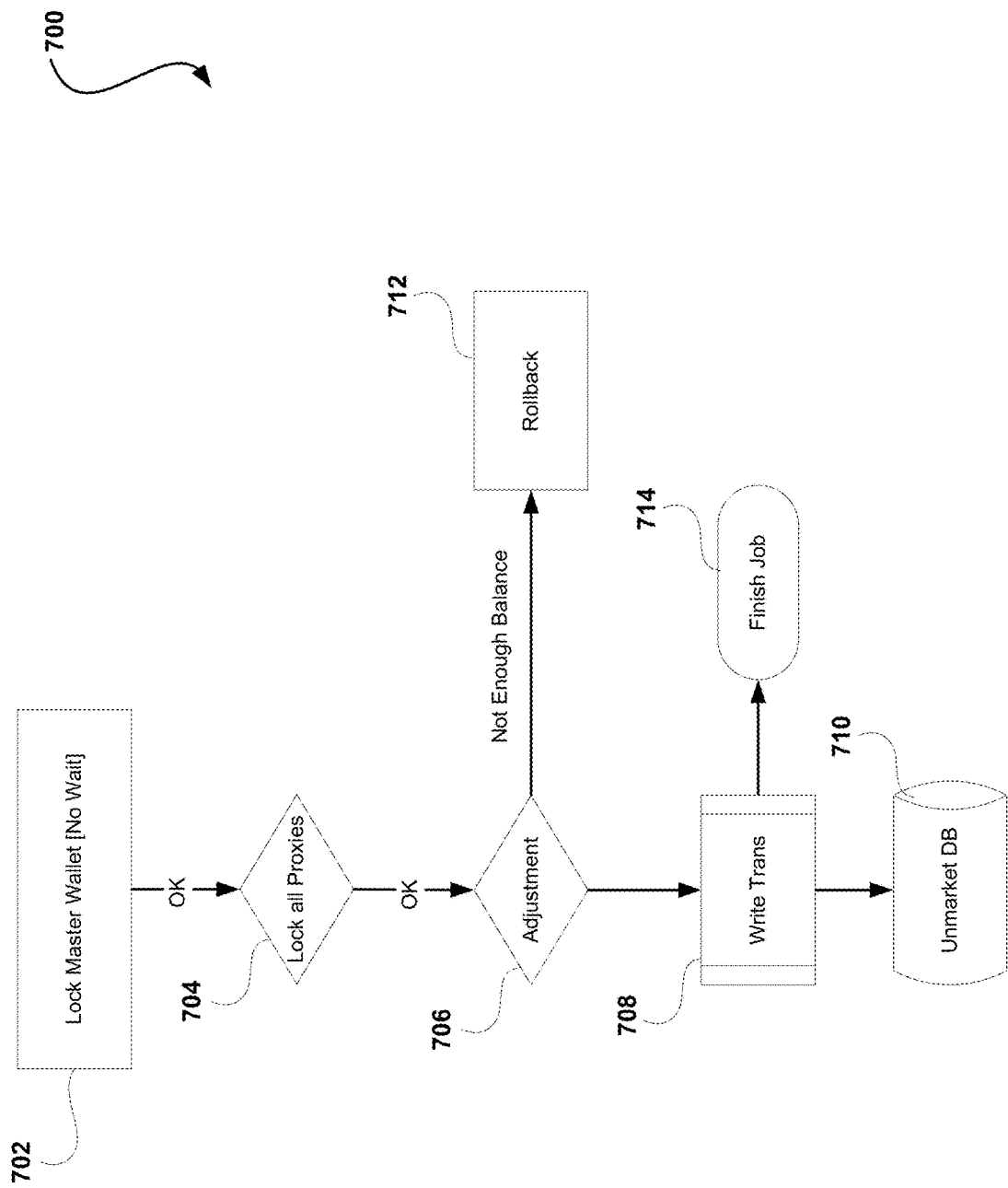
FIG. 7 illustrates an example of a high volume debtor performance improvement design flow for a case with insufficient funds, in accordance with one embodiment.

FIG. 7 illustrates an example 700 of a high volume debtor performance improvement design flow for a case with insufficient funds, in accordance with one embodiment. As an option, the example 700 may be viewed in the context of the details of the previous figures. Of course, however, the example 700 may be viewed in the context of any desired environment. Further, the aforementioned definitions may equally apply to the description below.

As shown, the master wallet is locked. See operation 702. After a lock on the master wallet is acquired, an attempt is made to lock all the proxy-wallets to accumulate the amount to be adjusted for the transaction. See operations 704 and 706. If there is not enough balance, there is a rollback of funds. See operation 712.

If there is sufficient balance, the transaction is written. See operation 708. Further, a database associated with the transaction is un-marketed and the job is completed. See operations 710 and 714.

Figure 8:
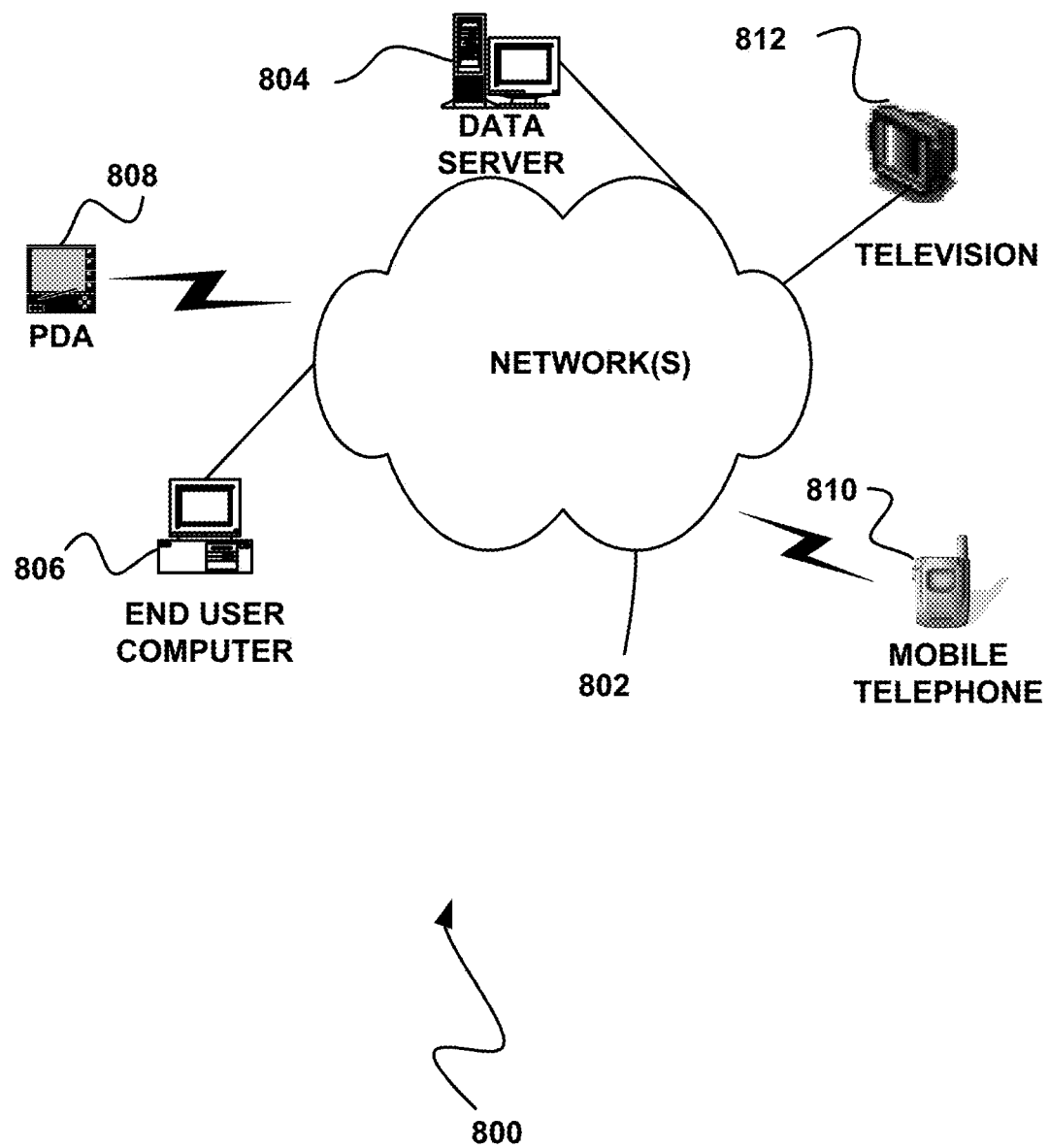
FIG. 8 illustrates a network architecture, in accordance with one possible embodiment.

FIG. 8 illustrates a network architecture 800, in accordance with one possible embodiment. As shown, at least one network 802 is provided. In the context of the present network architecture 800, the network 802 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 802 may be provided.

Coupled to the network 802 is a plurality of devices. For example, a server computer 804 and an end user computer 806 may be coupled to the network 802 for communication purposes. Such end user computer 806 may include a desktop computer, lap-top computer, and/or any other type of logic. Still yet, various other devices may be coupled to the network 802 including a personal digital assistant (PDA) device 808, a mobile phone device 810, a television 812, etc.

Figure 9:
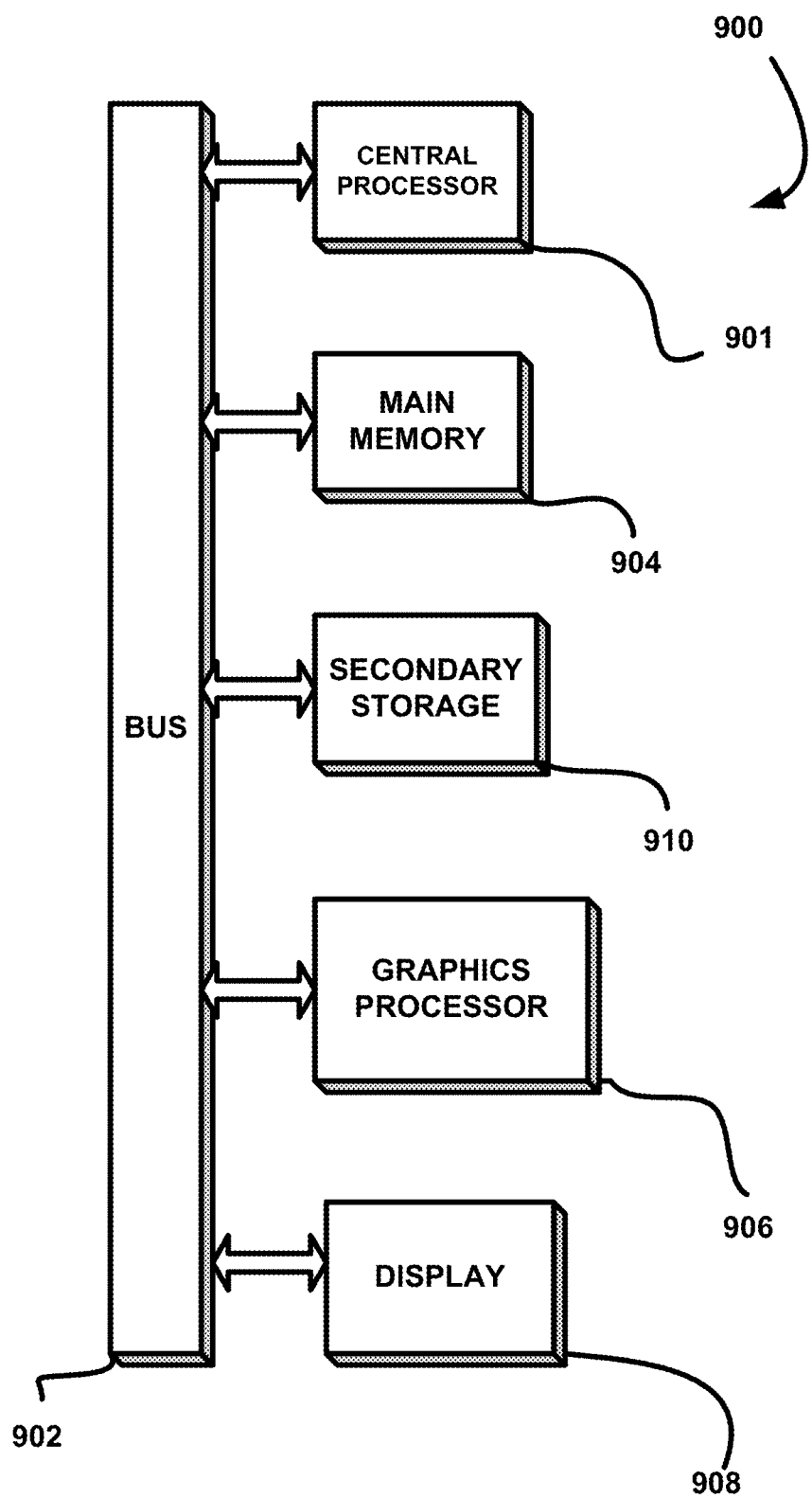
FIG. 9 illustrates an exemplary system, in accordance with one embodiment.

FIG. 9 illustrates an exemplary system 900, in accordance with one embodiment. As an option, the system 900 may be implemented in the context of any of the devices of the network architecture 800 of FIG. 8. Of course, the system 900 may be implemented in any desired environment.

As shown, a system 900 is provided including at least one central processor 901 which is connected to a communication bus 902. The system 900 also includes main memory 904 [e.g. random access memory (RAM), etc.]. The system 900 also includes a graphics processor 906 and a display 908.

The system 900 may also include a secondary storage 910. The secondary storage 910 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 904, the secondary storage 910, and/or any other memory, for that matter. Such computer programs, when executed, enable the system 900 to perform various functions (as set forth above, for example). Memory 904, storage 910 and/or any other storage are possible examples of tangible computer-readable media.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium, comprising computer code for:
   identifying a digital wallet with a plurality of transactions to process;
   determining a count of the plurality of transactions to process;
   automatically associating a plurality of digital proxy-wallets with the digital wallet, wherein a count of the plurality of digital proxy-wallets automatically associated with the digital wallet is based on the count of the plurality of transactions to process;
   associating each of the digital proxy-wallets with one of the transactions for processing thereof;
   allocating digital currency from the digital wallet to the plurality of digital proxy-wallets, including for each of the digital proxy-wallets:
      calculating an amount of the digital currency to allocate to the digital proxy-wallet based on an amount of the associated transaction to be processed by the digital proxy-wallet and a predicted amount for N future transactions to be processed by the digital proxy-wallet as determined from N prior transactions, and
      allocating the calculated amount of the digital currency from the digital wallet to the digital proxy-wallet; and
   automatically processing the plurality of transactions in parallel utilizing the plurality of digital proxy-wallets such that the transactions are processed at the same time without locking the digital wallet, including for each transaction of the plurality of transactions:
      locking the digital proxy-wallet associated with the transaction, and
      completing the transaction against the digital currency allocated to the digital proxy-wallet while the digital proxy-wallet is locked.

2. The computer program product of claim 1, wherein the digital wallet includes a payroll wallet.

3. The computer program product of claim 1, wherein the digital wallet includes an operator fee collection wallet.

4. The computer program product of claim 1, wherein the digital wallet includes a biller wallet.

5. The computer program product of claim 1, wherein the digital wallet includes a stock wallet.

6. The computer program product of claim 1, wherein the digital wallet includes a distributor wallet.

7. The computer program product of claim 1, wherein the digital wallet is configured to process the plurality of transactions serially when not utilizing the plurality of digital proxy-wallets.

8. The computer program product of claim 7, wherein processing the plurality of transactions in parallel utilizing the plurality of proxy-wallets allows the plurality of transactions to be processed in a shorter time period than processing the plurality of transactions serially when not utilizing the plurality of digital proxy-wallets.

9. The computer program product of claim 1, further comprising computer code for identifying remaining currency corresponding to one or more of the plurality of digital proxy-wallets after the automatic processing of the plurality of transactions.

10. The computer program product of claim 9, further comprising computer code for determining whether the remaining currency corresponding to the one or more of the plurality of digital proxy-wallets is enough currency to complete at least one additional transaction.

11. The computer program product of claim 10, wherein determining whether the remaining currency corresponding to the one or more of the plurality of digital proxy-wallets in enough currency to complete the at least one additional transaction includes determining whether a cumulative amount of currency of all of the one or more of the plurality of digital proxy-wallets is enough currency to complete the at least one additional transaction.

12. The computer program product of claim 11, further comprising computer code for, if the cumulative amount of currency of all of the one or more of the plurality of digital proxy-wallets is enough currency to complete the at least one additional transaction, utilizing the one or more of the plurality of digital proxy-wallets to allocate the cumulative amount of currency to complete the at least one additional transaction.

13. The computer program product of claim 11, further comprising computer code for, if the cumulative amount of currency of all of the one or more of the plurality of digital proxy-wallets is not enough currency to complete the at least one additional transaction, further comprising locking the digital wallet to determine if the cumulative amount of currency and an additional amount of currency is enough currency to complete the at least one additional transaction.

14. A method, comprising:
   identifying a digital wallet with a plurality of transactions to process;
   determining a count of the plurality of transactions to process;
   automatically associating a plurality of digital proxy-wallets with the digital wallet, wherein a count of the plurality of digital proxy-wallets automatically associated with the digital wallet is based on the count of the plurality of transactions to process;
   associating each of the digital proxy-wallets with one of the transactions for processing thereof;
   allocating digital currency from the digital wallet to the plurality of digital proxy-wallets, including for each of the digital proxy-wallets:
      calculating an amount of the digital currency to allocate to the digital proxy-wallet based on an amount of the associated transaction to be processed by the digital proxy-wallet and a predicted amount for N future transactions to be processed by the digital proxy-wallet as determined from N prior transactions, and
      allocating the calculated amount of the digital currency from the digital wallet to the digital proxy-wallet; and
   automatically processing the plurality of transactions in parallel utilizing the plurality of digital proxy-wallets such that the transactions are processed at the same time without locking the digital wallet, including for each transaction of the plurality of transactions:
      locking the digital proxy-wallet associated with the transaction, and
      completing the transaction against the digital currency allocated to the digital proxy-wallet while the digital proxy-wallet is locked.

15. The method of claim 14, wherein the digital wallet includes a payroll wallet.

16. The method of claim 14, wherein the digital wallet includes an operator fee collection wallet.

17. The method of claim 14, wherein the digital wallet includes a biller wallet.

18. The method of claim 14, wherein the digital wallet includes a stock wallet.

19. The method of claim 14, wherein the digital wallet includes a distributor wallet.

20. A system comprising:
- a memory system; and
- one or more processing cores coupled to the memory system and that are each configured for:
  - identifying a digital wallet with a plurality of transactions to process;
  - determining a count of the plurality of transactions to process;
  - automatically associating a plurality of digital proxy-wallets with the digital wallet, wherein a count of the plurality of digital proxy-wallets automatically associated with the digital wallet is based on the count of the plurality of transactions to process;
  - associating each of the digital proxy-wallets with one of the transactions for processing thereof;
  - allocating digital currency from the digital wallet to the plurality of digital proxy-wallets, including for each of the digital proxy-wallets:
    - calculating an amount of the digital currency to allocate to the digital proxy-wallet based on an amount of the associated transaction to be processed by the digital proxy-wallet and a predicted amount for N future transactions to be processed by the digital proxy-wallet as determined from N prior transactions, and
    - allocating the calculated amount of the digital currency from the digital wallet to the digital proxy-wallet; and
  - automatically processing the plurality of transactions in parallel utilizing the plurality of digital proxy-wallets such that the transactions are processed at the same time without locking the digital wallet, including for each transaction of the plurality of transactions:
    - locking the digital proxy-wallet associated with the transaction, and
    - completing the transaction against the digital currency allocated to the digital proxy-wallet while the digital proxy-wallet is locked.

* * * * *